US011405357B2

(12) United States Patent
Grant

(10) Patent No.: US 11,405,357 B2
(45) Date of Patent: Aug. 2, 2022

(54) PROTECTING INTERNET OF THINGS (IOT) DEVICES AT THE NETWORK LEVEL

(71) Applicant: CLOUDFLARE, INC., San Francisco, CA (US)

(72) Inventor: Dani Grant, Los Altos, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 265 days.

(21) Appl. No.: 16/397,536

(22) Filed: Apr. 29, 2019

(65) Prior Publication Data
US 2019/0334869 A1 Oct. 31, 2019

Related U.S. Application Data

(60) Provisional application No. 62/664,011, filed on Apr. 27, 2018.

(51) Int. Cl.
H04L 29/06 (2006.01)
H04L 29/08 (2006.01)
H04L 29/12 (2006.01)
G06F 8/65 (2018.01)
H04L 9/40 (2022.01)
H04L 67/12 (2022.01)
(Continued)

(52) U.S. Cl.
CPC ............ H04L 63/0236 (2013.01); G06F 8/65 (2013.01); H04L 61/1511 (2013.01); H04L 61/2007 (2013.01); H04L 63/0263 (2013.01); H04L 63/0823 (2013.01); H04L 63/20 (2013.01); H04L 67/12 (2013.01); H04L 67/141 (2013.01); H04L 67/32 (2013.01)

(58) Field of Classification Search
CPC . H04L 63/0236; H04L 67/12; H04L 61/1511; H04L 61/2007; H04L 67/141; H04L 63/0263; H04L 63/0823; H04L 63/20; H04L 67/32; H04L 61/3025; H04L 61/305; G06F 8/65
USPC ........................................................... 726/1
See application file for complete search history.

(56) References Cited

U.S. PATENT DOCUMENTS 9,774,604 B2    9/2017 Zou et al.
9,942,235 B2 *  4/2018 Bagasra ................ H04W 12/08
(Continued)

FOREIGN PATENT DOCUMENTS

WO    2018116123 A1    6/2018

Primary Examiner — Kambiz Zand
Assistant Examiner — Aubrey H Wyszynski
(74) Attorney, Agent, or Firm — Nicholson De Vos Webster & Elliott LLP

(57) ABSTRACT

An Internet of Things (IoT) protection service at the network level is described. A secure session is established between an edge server and an IoT client that is requesting to send data to an IoT device. The edge server receives the request from the IoT client over the secure session instead of the IoT device directly because a Domain Name System (DNS) request for a unique fully qualified domain name assigned to the IoT device returns an IP address of the edge server instead of an IP address of the IoT device. The edge server analyzes the request to determine whether to transmit the request to the IoT device, including applying web application firewall rule(s) against the request. If the request does not trigger any rule, then the edge server transmits the request to the IoT device. If the request triggers any rule, then the edge server blocks the request.

21 Claims, 6 Drawing Sheets

(51) Int. Cl.
    *H04L 61/4511*     (2022.01)
    *H04L 61/5007*     (2022.01)
    *H04L 67/141*     (2022.01)
    *H04L 67/60*     (2022.01)

(56) References Cited

U.S. PATENT DOCUMENTS

| | | |
|---|---|---|
| 10,212,178 B2 | 2/2019 | Cheng et al. |
| 10,642,969 B2 * | 5/2020 | James .................... H04L 67/12 |
| 10,671,765 B2 | 6/2020 | Swierk et al. |
| 10,701,103 B2 * | 6/2020 | Aggarwal ........... H04L 63/1425 |
| 10,778,775 B2 * | 9/2020 | Lear ........................ H04L 63/10 |
| 2004/0111315 A1 * | 6/2004 | Sharma .................. H04L 29/06 709/223 |
| 2015/0381756 A1 * | 12/2015 | Lotfallah ................ H04L 67/18 709/213 |
| 2015/0381776 A1 * | 12/2015 | Seed ....................... H04L 67/16 709/203 |
| 2016/0021055 A1 * | 1/2016 | Krzywonos ........... H04L 61/301 709/245 |
| 2017/0310709 A1 * | 10/2017 | Foxhoven ........... H04L 61/1511 |
| 2017/0311303 A1 * | 10/2017 | Ahn .................. H04W 72/0406 |
| 2018/0359269 A1 * | 12/2018 | Caceres ............. H04L 63/1425 |
| 2019/0089747 A1 | 3/2019 | Wang et al. |

* cited by examiner

PROTECTING INTERNET OF THINGS (IOT) DEVICES AT THE NETWORK LEVEL

CROSS-REFERENCE TO RELATED APPLICATIONS

This application claims the benefit of U.S. Provisional Application No. 62/664,011, filed Apr. 27, 2018, which is hereby incorporated by reference.

FIELD

Embodiments of the invention relate to the field of computer devices and security; and more specifically, to protecting Internet of Things (IoT) devices at the network level.

BACKGROUND

The Internet of Things (IoT) is a network of devices that are embedded with electronics and software to enable the objects to connect and exchange data through the internet. These devices were typically not previously connected to the Internet. For example, the devices can be home appliances (e.g., ovens, fridges, dishwashers, vacuum cleaners, etc.), entertainment devices, wearable devices, health devices (e.g., scales, blood pressure monitors, etc.), baby monitors, thermostats, cameras, automobiles, etc.

Many IoT devices get their connectivity through existing internet infrastructure. For example, many home IoT devices are plugged into a home router or connect through a WiFi connection. In some cases, on startup, the IoT device communicates with the home router (e.g., according to the Universal Plug and Play (UPnP) protocol) to configure forward of any incoming Internet traffic on an arbitrary high port to themselves (the IoT device). The IoT device then listens on that port for any incoming connections. The IoT device also connects to a central IoT service (typically provided by the maker of the IoT device) to let that central IoT service know the IP address of that IoT device. The IoT device can also provide metadata including a device ID, the port it is listening on, a shared cryptographic secret, etc. The central IoT service receives the information and adds the IoT device to its device registry. When a remote device (outside the home network of the IoT device) wants to communicate with the IoT device (e.g., if a user wants to check in on their home thermostat from work), the central IoT service looks in the device registry, finds the last IP address and port for the device, and returns it to the requester. The requester then communicates to the IoT device (the thermostat in this case) directly at the IP address and port supplied by the IoT central service.

In other cases, the IoT devices poll the IoT central service for new commands (e.g., once every N seconds). If someone, for example. wanted to change a setting in the device, the change would be stored on the server and the next time the IoT device polled the server, the change would be transmitted to the IoT device.

IoT devices are subject to attacks like other computing devices. Often, consumers do not change the default username and password to IoT devices. IoT manufacturers create patches for vulnerabilities, but they have a relatively low installation rate by the home users. In some cases, installing the updates requires shutting down the IoT device. Shutting down the IoT device may not be easy if the IoT device is used in life-critical function (e.g., in industrial control, medical, or automotive spaces). IoT manufacturers are also wary of sending a bad update that causes the IoT devices to improperly or cease functioning. Also, many IoT devices are exposed to the internet without the protection of a network firewall. These problems are exacerbated by the lifetime of certain IoT devices (e.g., consumers buy new home appliances such as a refrigerator or a thermostat very infrequently).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
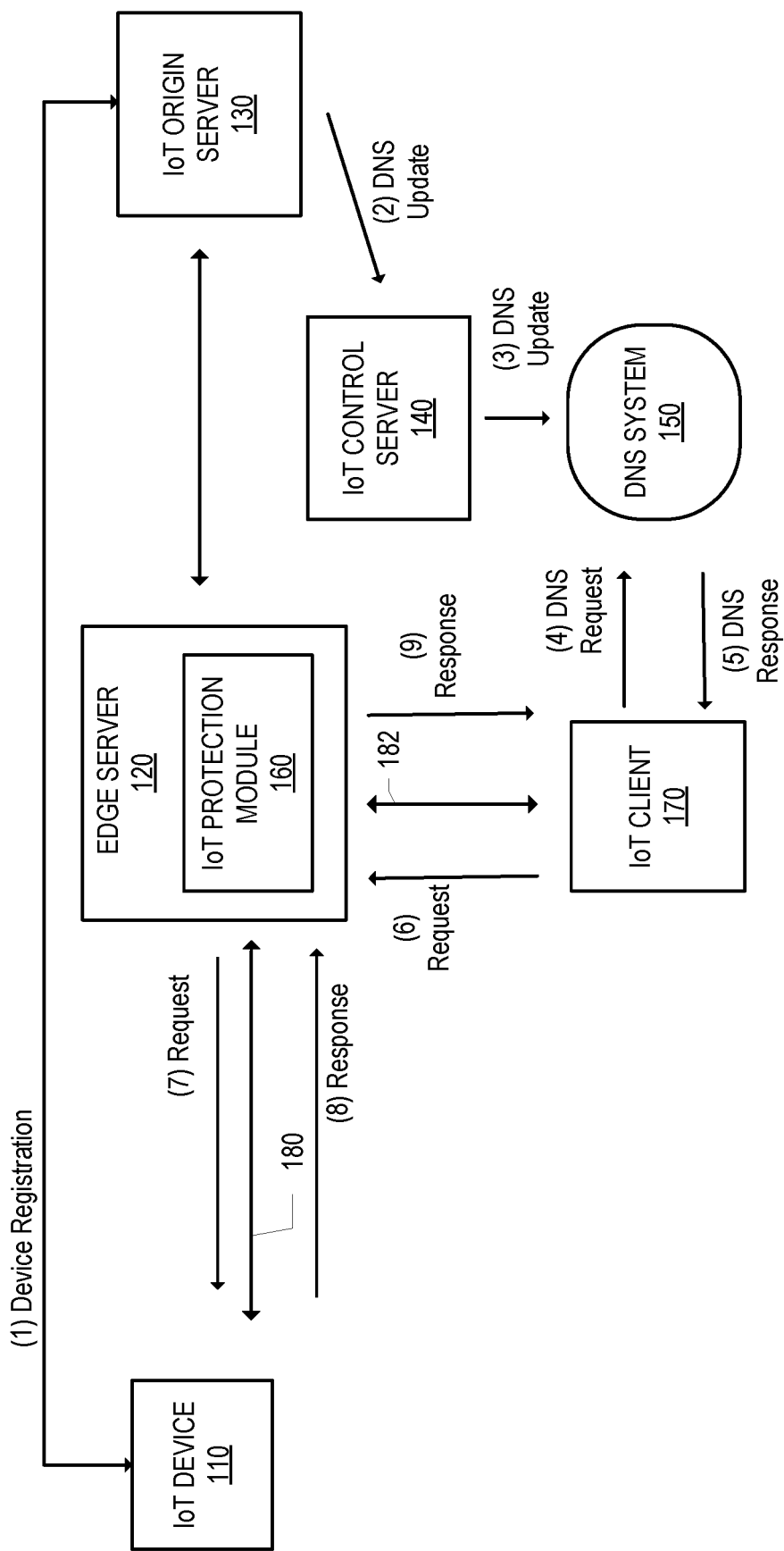
FIG. 1 shows an example of the IoT protection service according to an embodiment.

Protecting IoT devices at the network level is described. In an embodiment, an IoT protection service wraps an IoT device in its own private network that is maintained by the IoT protection service. Instead of relying on security of only the IoT device, the IoT protection service uses the network as an additional layer of security and authentication. The IoT protection service is configured to catch exploit attempts on the fly. Even if the IoT device is running vulnerable code (e.g., code that is not patched for a vulnerability), the exploit may be stopped at the network layer by the IoT protection service. A secure and authenticated connection may be established by the IoT protection service between the IoT device and its central IoT server.

The IoT protection service includes one or more servers (e.g., one or more edge servers, one or more control servers, one or more DNS servers), and one or more other pieces of network equipment such as router(s), switch(es), and/or hub(s)). The server(s) may be geographically distributed and located in multiple points-of-presences that may be part of a different data center and/or colocation site.

An edge server of the IoT protection service includes web application firewall (WAF) rules for protecting the IoT device. The rules may be configurable by the IoT device manufacturer. The WAF ruleset may be periodically updated according to newly discovered exploits. Example rules may include to protect against one or more of the following: injection attacks (e.g., when untrusted data is sent as part of a command or query), authentication attacks (e.g., exploiting flows to try to obtain passwords, keys, or session tokens), sensitive data attacks (e.g., financial, healthcare, and personally identifiable information (PII)), XML external entities (XXE) attacks, access control attacks, cross-site scripting attacks, security misconfiguration attacks, etc. Specific rules may include: disallow inbound connections (do not allow new inbound connections, which may be used on devices that are only to perform outbound requests); server authentication (check that all requests come from the server's IP address and optionally the server's ASN, which is to ensure that a machine is not pretending to be the server and sending bad instructions to the IoT device); HTTP fingerprinting for the IoT device or IoT client and the server (check the header order and capitalization on the requests between the IoT device or IoT client and the server to flag anomalies as possible attempts at server or device impersonation); content type check (check whether the request is sending the content-type it is supposed to send); user-agent check (check whether the request includes an allowed user-agent); and block all unencrypted traffic.

An IoT device connects with a central IoT cloud service to announce that it exists. The IoT device may communicate its IP address and metadata (e.g., a device ID, a port it is listening on, a shared cryptographic secret, etc.). The IoT cloud service causes a Domain Name System (DNS) record to be added for the IoT device's endpoint at the current device's IP address. Instead of using the IP address directly to communicate with the with the IoT device, the IoT service configures its cloud and/or mobile applications to use a DNS lookup to find the IoT device. A DNS lookup for that IoT device returns an IP address of a server in the IoT protection service (e.g., an edge server of the IoT protection service). Thus, traffic from the IoT service is received through the IoT protection service.

FIG. 1 shows an example of the IoT protection service according to an embodiment. The system shown in FIG. 1 includes the IoT device 110, the edge server 120 that is part of the IoT protection service, the IoT origin server 130, the IoT control server 140, the DNS system 150, and the IoT client 170. The IoT device 110 is an IoT device that can connect to the internet. The IoT device 110 can be any type of IoT device, such as a home appliance, entertainment device, wearable device, entertainment device, wearable device, health care device, baby monitor, thermostat, camera, automobiles, etc. The IoT device 110 may be installed within a home network of the user. The IoT device 110 may be configured to communicate over the internet via HTTP and/or HTTPs.

The edge server 120 is a server that is part of the IoT protection service. The edge server 120 is typically not owned or operated by the maker of the IoT device. For instance, the IoT protection service may be a third-party service that does not require customers (e.g., IoT device manufacturers) to install hardware or software for using the service. Instead, the IoT protection service exists at the network level.

The IoT origin server 130 is an origin server of the central IoT service that is typically provided or maintained by the maker of the IoT device. Prior to embodiments described herein, the IoT devices would typically communicate directly with the IoT origin server. The IoT origin server 130 may be owned or operated directly or indirectly by a customer of the IoT protection service.

The IoT control server 140 is operated by the IoT protection service and provides a set of tools and interfaces for the customer of the IoT protection service to configure the IoT protection service. For example, the IoT control server 140, among other things, allows a customer of the IoT protection service to register for service, configure the service, and assists the customer in changing domain records as will be described in greater detail later herein.

The DNS system 150 is used to refer to the DNS system as a whole and includes multiple DNS servers to resolve DNS requests. Accordingly, when the DNS system 150 receives a DNS query for a domain, it returns the answer. The DNS system 150 includes one or more DNS servers (e.g., preferred domain servers, top-level domain name servers, authoritative nameservers, and/or other domain servers). There may be multiple authoritative web servers for the service and they may be geographically distributed.

The IoT client 170 is an internet client that is configured to communicate with an IoT device. For example, the IoT client 170 may access data provided by the IoT device 110 and/or submit data to the IoT device 110. The IoT client 170 may be a cloud application that communicates with the IoT device, an application installed on a mobile device, etc.

At operation 1, the IoT device 110 performs a device registration process with the IoT origin server 130. This may be done upon the IoT device 110 being turned on and connected to the internet. The IoT device 110 may use existing internet infrastructure to connect to the IoT origin server 130 (e.g., a WiFi connection, a 3G/4G/5G connection, etc.). If installed in a home network, the IoT device 110 is typically allocated a private IP address by a router installed in the home network and configure forwarding of any incoming internet traffic on an arbitrary port to themselves. During device registration with the IoT origin server 130, the IoT device 110 sends information to allow the IoT origin server 130 to register the IoT device 110 in its IoT device registry. For example, the information sent may include a device identifier, the IP address of the IoT device (which may be the public IP address of the IoT device), the port in which the IoT device 110 is listening, and may include a shared cryptographic secret. The device registration may be received by the IoT origin server 130 over the internet without passing through the edge server 120 (as illustrated) or may be received by the edge server 120. If received by the edge server 120, the edge server 120 may proxy the device registration messages between the IoT device 110 and the origin server 130. The edge server 120 may authenticate the IoT device 110 and/or the IoT origin server 130 before proxying the device registration messages. In an embodiment, the edge server 120 may receive a device registration message from the IoT device as a result of a DNS request for a domain of the registration service handled by the IoT origin server 130 returning an IP address of the edge server 120 instead of an IP address of the IoT origin server 130.

As part of the device registration, the IoT origin server 130 transmits a message to the IoT control server 140 to update or add a DNS record for the IoT device 110. The IoT control server 140 may provide an API that allows the IoT origin server 130 to add a DNS record for the IoT device 110 at the current device's IP address. A unique fully qualified domain name (FQDN) may be assigned to the IoT device. For instance, if the IoT origin server handles the domain "example.com", the unique fully qualified domain name may take the form of "[Device_ID].example.com" where the device_id is a unique identifier of the IoT device (e.g., a universally unique identifier (UUID)). For instance, if the unique device identifier of the IoT device 110 is device1, then the IoT origin server 130 may use the API to request a DNS record be added for "device1.example.com" for the IoT device 110. The unique identifier may be assigned to the IoT device by the IoT manufacturer (e.g., during manufacturing). The unique identifier may be formed using the IP address of the IoT device and the port in which it is listening. The IoT control server 140 updates the DNS system 150 such that a DNS record for the IoT device 110 points to the edge server 120 instead of to the IoT device 110 directly, at operation 3. For example, a DNS request for an IP address of "device1.example.com" returns an IP address of the edge server 120 instead of the IP address of the IoT device 110.

Although FIG. 1 shows the IoT origin server 130 initiating the DNS update to add or update a DNS record for the IoT device 110, the edge server 120 may initiate the DNS update to add or update a DNS record for the IoT device 110. For instance, if the edge server 120 receives the device registration message from the IoT device 110 (e.g., if the edge server 120 is operating as a proxy for the domain of the IoT origin server 130), the edge server 120 may cause a DNS record for the IoT device 110 to be added or updated to the DNS system 150.

After the DNS record for the IoT device 110 has been added or updated, IoT clients may communicate with the IoT device 110 (if allowed by the configuration). Instead of using the IP address of the IoT device 110 to reach it directly, IoT clients are configured to perform a DNS resolution for the IoT device 110 to learn the IP address of the IoT device 110 (which is maintained by the IoT protection service). For instance, the IoT client 170 is configured to perform a DNS resolution for the IoT device 110 instead of reaching the IoT device 110 directly at its IP address. Thus, at operation 4, the IoT client 170 makes a DNS request to the DNS system 150. In this example, the DNS request is for an address record for "device1.example.com." At operation 5, the IoT client 170 receives a DNS response to the request. In this case, the returned response includes an IP address of the edge server 120 instead of an IP address of the IoT device 110.

The IoT client 170 then makes a request that is destined for the IoT device 110 at operation 6 that is received by the edge server 120. The request is for an action to be performed on an identified resource of the IoT device 110. The request may be an HTTP request (e.g., a GET request, a POST request). The edge server 120 receives the request and performs one or more operations for processing the request including analyzing the request to determine whether to transmit the request to the IoT device.

Prior to receiving and processing the request from the IoT client 170, a secure session (e.g., a Transport Layer Security (TLS) session) may be established between the edge server 120 and the IoT client 170. If the request is received using HTTP, the edge server 120 may cause the request to be resent using HTTPS thereby triggering a secure session to be established. The secure session may be protected with mutual TLS authentication. In this case, mutual TLS authentication allows the IoT protection service to determine that the IoT client belongs to the IoT vender's network, and not for example a malicious attacker trying to infiltrate their IoT infrastructure. This ensures that traffic directed to the IoT device is coming from an authorized client (e.g., from the IoT manufacturer's cloud, IoT gateway, and/or IoT application). For example, the customer of the IoT protection service (e.g., the IoT manufacturer) may upload one or more root certificates for which the client certificates are validated against. The certificate(s) may be uploaded to the IoT control server 140 and distributed to the edge server 120. During the secure session establishment, the IoT client 170 transmits its certificate to the edge server 120. The edge server 120 performs an authentication to determine whether the client certificate is one of the certificates allowed. For example, the edge server 120 may validate that the client certificate presented by the IoT client 170 is signed by the IoT manufacturer's root CA certificate. By validating this certificate on each request, access can be limited to authorized client connections from authorized IoT clients. If the certificate is validated, then the secure session can be established (shown as communication link 182) and the request can be processed by the edge server 120 in operation 6. If the certificate is not validated, then the secure session may be refused and the edge server 120 may transmit a message to the IoT client 170 that indicates that the certificate is missing, expired, or invalid (e.g., a 403 error).

The IoT protection module 160 may operate a web application firewall (WAF) that applies one or more rules to determine whether to transmit the request to the IoT device. The WAF ruleset may be periodically updated according to newly discovered exploits. Example rules may include to protect against one or more of the following: injection attacks (e.g., when untrusted data is sent as part of a command or query), authentication attacks (e.g., exploiting flows to try to obtain passwords, keys, or session tokens), sensitive data attacks (e.g., financial, healthcare, and personally identifiable information (PII)), XML external entities (XXE) attacks, access control attacks, cross-site scripting attacks, security misconfiguration attacks, etc. Specific rules may include: disallow inbound connections (do not allow new inbound connections, which may be used on devices that are only to perform outbound requests); server authentication (check that all requests come from the server's IP address and optionally the server's ASN, which is to ensure that a machine is not pretending to be the server and sending bad instructions to the IoT device); HTTP fingerprinting for the IoT device and the server (check the header order and capitalization on the requests between the IoT device and the server to flag anomalies as possible attempts at server or device impersonation); content type check (check whether the request is sending the content-type it is supposed to send); user-agent check (check whether the request includes an allowed user-agent); and block all unencrypted traffic. The WAF rules may include blocking certain protocols or port, such as blocking SSH and/or telnet.

Alternatively, or in addition to applying a WAF, the IoT protection module 160 may perform a rate limiting mitigation to identify and mitigate high request rates automatically. This may prevent brute force attempts to crack passwords of IoT devices. For instance, once a client (a sender with an individual IP address) exceeds a rule threshold, requests matching the pattern will not be sent to the IoT device 110 for a period.

The IoT protection module 160 protects the IoT device even if it is running vulnerable code. For instance, if the IoT device is running code that is not patched for a vulnerability, the exploit may be stopped at the network layer by the IoT protection service. An IoT manufacturer can configure logic for the IoT protection module 160 to execute to address the vulnerability, and/or the protection service can add/update the WAF rules to protect against the vulnerability. Since the logic is applied at the network level, effectively all the IoT devices are updated without the users of the IoT devices having to install anything.

If IoT protection module 160 has determined that the request can be sent to the IoT device, then the request may be transmitted to the IoT device 110 at operation 7. If the IoT protection module 160 has determined that the request should not be sent to the IoT device 110 (e.g., the request triggered a WAF rule), then the IoT protection module 160 may take protective action (e.g., blocking the request).

Prior to transmitting the request to the IoT device, the edge server 120 may establish a secure session (e.g., an Transport Layer Security (TLS) session) with the IoT device. The secure session may be protected with mutual TLS authentication.

If the request is sent to the IoT device 110, the IoT device 110 may respond with a response (e.g., typically some data generated and/or stored by the IoT device 110), at operation 8. The edge server 120 may transmit the response to the IoT client 170 at operation 9, and/or the IoT origin server 130.

The IoT device 110 may be configured to only allow connections from a predefined set of one or more IP addresses, such as the IP address(es) of the edge server 120. Thus, prior to performing any action in response to the request at operation 7, the IoT device may determine whether the connection is from an allowed IP address. If it is not, then it will not process the request. If it is, then the request will proceed.

Although some IoT manufacturers implement their own client authentication, they do so at their origin server that handles the rest of their IoT infrastructure. This is computationally expensive. Also, any invalid traffic flood causes a burden on the entire origin server. With the edge server 120 of the IoT protection service performing client authentication, the edge server 120 handles the load of the TLS handshakes, thereby validating the IoT device client certificates and only sending the IoT infrastructure traffic from authorized devices.

As previously described, the IoT manufacturer may periodically issue patches and/or updates to the firmware and/or software of its IoT devices. In an embodiment, these patches and/or updates can be cached by the edge server 120 and delivered to IoT devices. Since there may be many edge servers that are geographically distributed (typically closer to the IoT devices than the IoT origin server), patches and/or updates can be downloaded to the IoT device faster than downloading from the IoT origin server. This improves the experience for the user and may save battery life for the device (if operating on a battery). Also, serving these patches/updates from the cache of the edge server saves on bandwidth from the IoT origin server. For example, if the patches and/or updates to the firmware and/or software are served from "updates.example.com" that resolves to an edge server of the IoT protection service, these updates can be cached at the edge servers and served from the edge to the requesting IoT devices. If an IoT device requests an update, the edge server may provide the update to the IoT device without contacting the origin server.

Figure 2:
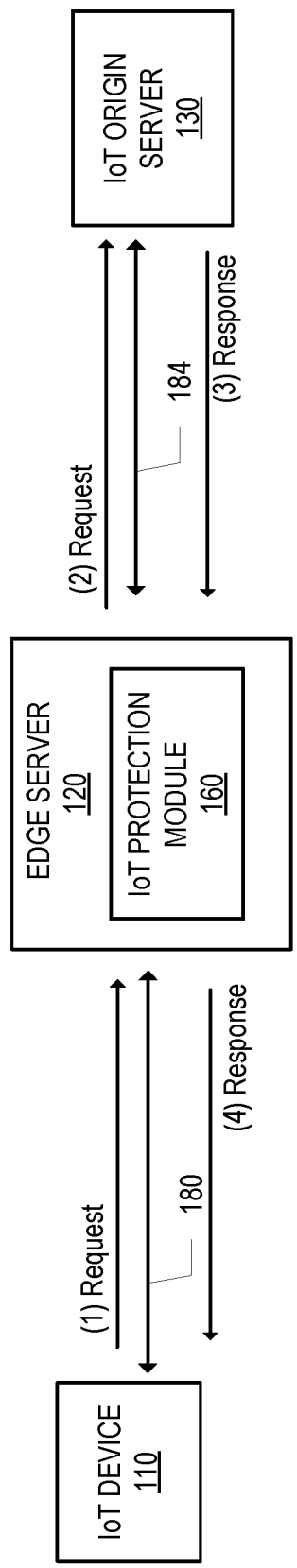
FIG. 2 shows an example of the IoT protection service where the IoT device is making a request to the IoT infrastructure, according to an embodiment.

In some cases, the IoT device 110 may transmit requests to the IoT infrastructure (e.g., the IoT origin server 130). FIG. 2 shows an example of the IoT protection service where the IoT device 110 is making a request to the IoT infrastructure, in the case the IoT origin server 130. The IoT device 110 may periodically communicate with the IoT origin server 130 to provide data, request data, etc. For instance, the IoT device may be configured to poll the IoT origin server for new commands (e.g., once every N seconds).

In an embodiment, the IoT device 110 and the edge server 120 establish a secure session (e.g., a TLS connection). The secure session may be protected with mutual TLS authentication. In this case, mutual TLS authentication allows the IoT protection service to determine that an IoT device belongs to the IoT vender's network, and not for example a malicious attacker trying to infiltrate their IoT infrastructure. The customer of the IoT protection service (e.g., the IoT manufacturer) may upload one or more root certificates for which the device certificates are validated against. The certificate(s) may be uploaded to the IoT control server 140 and distributed to the edge server 120. During the secure session establishment, the IoT device 110 transmits its certificate to the edge server 120. The edge server 120 performs an authentication to determine whether the client certificate is one of the certificates allowed. For example, the edge server 120 may validate that the client certificate presented by the IoT device 110 is signed by the IoT manufacturer's root CA certificate. By validating this certificate on each request, access can be limited to authorized client connections from authorized IoT devices. If the certificate is validated, then the secure session can be established (shown as communication link 180) and the request can be received and processed by the edge server in operation 1. If the certificate is not validated, then the secure session may be refused and the edge server 120 may transmit a message to the IoT device 110 that indicates that the certificate is missing, expired, or invalid (e.g., a 403 error). Thus, the request may be blocked if the secure session fails to be established and/or if a valid certificate is not presented.

If the request is received by the edge server 120, the edge server 120 may analyze the request to determine whether to forward the request to the IoT origin server 130. For instance, the IoT protection module 160 may apply one or more web application firewall (WAF) rules against the request to determine whether the request should be transmitted to the IoT origin server 130. Examples of WAF rules that may be applied are previously described herein. Additionally, or alternatively, the IoT protection module 160 may perform rate limiting check to identify and mitigate high request rates. For instance, the rate limiting check may determine if the sender of the request (e.g., as identified by source IP address) exceeds a threshold and if so, rate limit the sender.

If the IoT protection module 160 has determined that the request can be sent to the IoT origin server 130, then the request may be transmitted to the IoT origin server 130 at operation 2. If the IoT protection module 160 has determined that the request should not be sent to the IoT origin server 130 (e.g., the request triggered a WAF rule), then the IoT protection module 160 may take protective action (e.g., blocking the request).

Prior to transmitting the request to the IoT origin server 130, the edge server 120 may establish a secure session (e.g., an Transport Layer Security (TLS) session) with the IoT origin server 130, shown as communication link 184 in FIG. 2. The secure session may be protected with mutual TLS authentication, where the edge server 120 presents a certificate signed by a CA. The origin server 130 may then validate whether the certificate is valid. This allows the origin server 130 to limit access to connections with valid certificates of the IoT protection service. Additionally, or alternatively, the IoT origin server may only allow requests from a predefined set of IP address(es), such as the IP address(es) of the edge server 120.

The IoT origin server 130 may transmit a response to the request. Thus, at operation 3, the edge server 120 receives a response from the IoT origin server 130. The response typically includes data generated and/or stored by the IoT origin server 130. The edge server 120 transmits the response to the IoT device 110.

Figure 3:
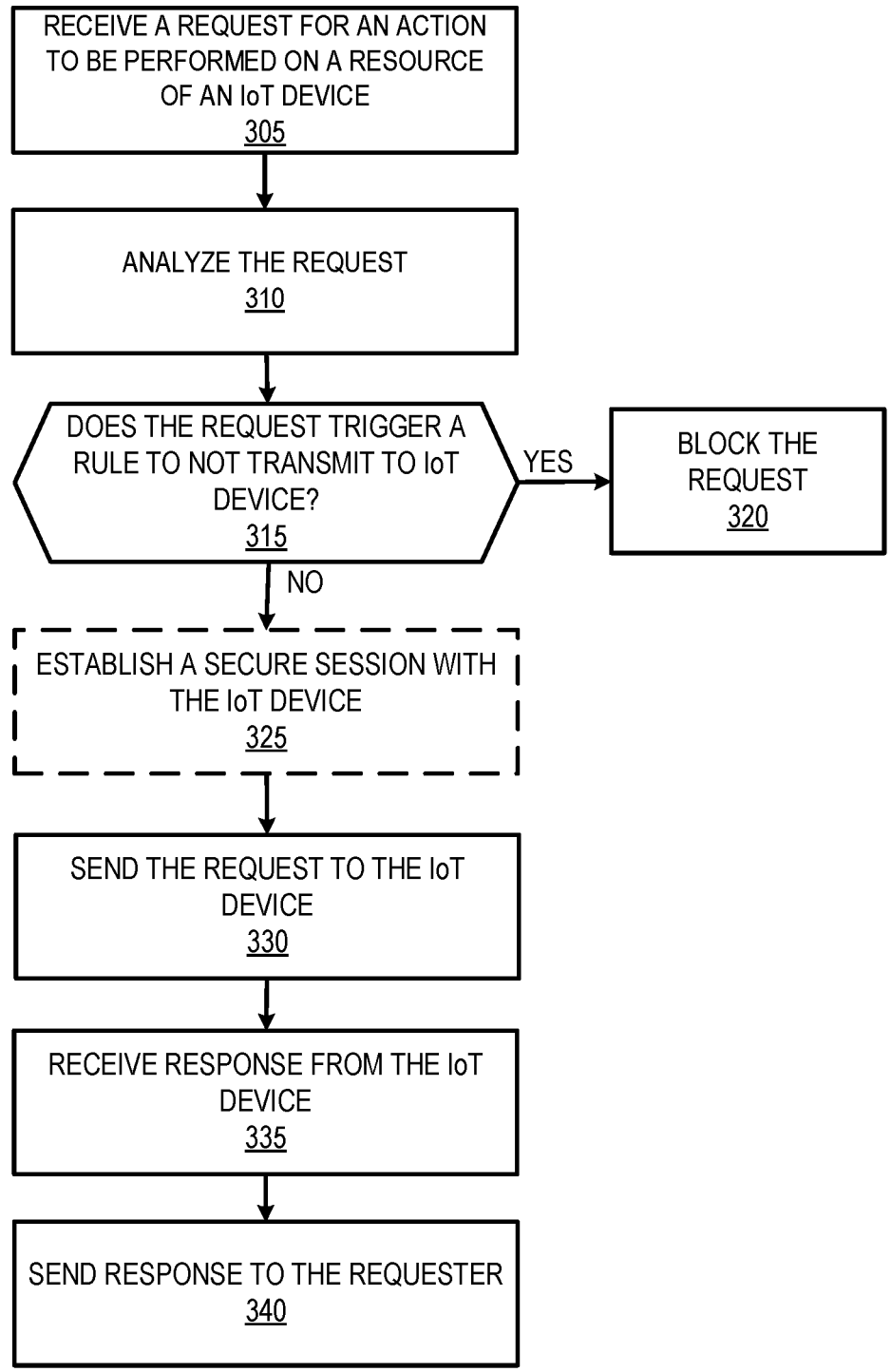
FIG. 3 shows example operations that are performed for an IoT protection service according to an embodiment.

FIG. 3 shows an example of operations that are performed for an IoT protection service according to an embodiment. The operations shown in FIG. 3 will be described as performed by an edge server of the IoT protection service (e.g., the edge server 120). The operations of FIG. 3 will be described with respect to the exemplary embodiment of FIG. 1. However, the operations of FIG. 3 can be performed by different embodiments than those of FIG. 1, and FIG. 1 can perform operations different than those of FIG. 3.

At operation 305, a request for an action to be performed on an identified resource of the IoT device 110 is received by the edge server 120, from an IoT client. The request may be an HTTP request (e.g., a GET request, a POST request).

The request may be received at the edge server because a DNS request for a unique FQDN assigned to the IoT device 110 returns an IP address of the edge server 120 instead of an IP address of the IoT device 110. To say it another way, DNS lookups for the IoT device 110 resolve to an IP address of the edge server 120 instead of the IoT device 110.

The request may be received over a secure session (e.g., a TLS connection) between the requesting IoT client and the edge server 120. The secure session may be protected with mutual TLS authentication to allow the IoT protection service to determine that the IoT client belongs to the IoT vender's network, and not for example a malicious attacker trying to infiltrate their IoT infrastructure. This ensures that traffic directed to the IoT device is coming from an authorized client (e.g., from the IoT manufacturer's cloud, IoT gateway, and/or IoT application). The customer of the IoT protection service (e.g., the IoT manufacturer) may upload one or more root certificates for which the client certificates are validated against. The certificate(s) may be uploaded to the IoT control server 140 and distributed to the edge server 120. During the secure session establishment, the IoT client 170 transmits its certificate to the edge server 120. The edge server 120 performs an authentication to determine whether the client certificate is one of the certificates allowed. For example, the edge server 120 may validate that the client certificate presented by the IoT client 170 is signed by the IoT manufacturer's root CA certificate. By validating this certificate on each request, access can be limited to authorized client connections from authorized IoT clients. If the certificate is validated, then the secure session can be established (shown as communication link 182 in FIG. 1) and the request can be processed by the edge server 120. If the certificate is not validated, then the secure session may be refused and the edge server 120 may transmit a message to the IoT client 170 that indicates that the certificate is missing, expired, or invalid (e.g., a 403 error).

Next, at operation 310, the edge server 120 analyzes the request to determine whether to transmit the request to the IoT device 110. For instance, the IoT protection module 160 may apply one or more web application firewall (WAF) rules against the request to determine whether the request should be transmitted to the IoT device 110. Examples of WAF rules that may be applied are previously described herein. Additionally, or alternatively, the IoT protection module 160 may perform rate limiting check to identify and mitigate high request rates. For instance, the rate limiting check may determine if the sender of the request (e.g., as identified by source IP address) exceeds a threshold and if so, rate limit the sender.

At operation 315, the edge server 120 determines whether the request triggers a rule to not transmit the request to the IoT device 110. For instance, if the request triggers a WAF rule, the edge server 120 will block the request. As another example, if the request triggers rate limiting, the edge server 120 will block the request and future requests from the sender for a period. If the request triggers a rule to not transmit to the IoT device 110, then at operation 320 the edge server 120 blocks the request. The edge server 120 may log the blocking of the request. If, however, the request does not trigger a rule to not transmit to the IoT device 110, then operations flow to operation 325.

As previously described, the WAF rules may be periodically updated. For instance, new WAF rules may be installed to protect against newly discovered exploits of the IoT device. If a vulnerability of the IoT device is discovered, a WAF rule may be created and applied thereby protecting the IoT device against the exploit. This protection occurs without the firmware/software being updated. This may also give time for the IoT manufacturer to create and test any patch or update.

At operation 325, which is optional in an embodiment, the edge server 120 participates in a secure session establishment (e.g., a TLS session) with the IoT device 110. The secure session may be protected with mutual TLS authentication. If the secure session cannot be established, then the operations end. However, if the secure session can be established, then operations move to operation 330.

At operation 330 the edge server 120 sends the request to the IoT device 110. The IoT device 110 processes the request. The IoT device 110 may transmit data in a response to the request. Thus, at operation, 335, the edge server 120 receives a response to the request from the IoT device 110. The response may be destined for the IoT origin server 130 and/or the IoT client 170. At operation 340, the edge server 120 sends the response to the requester. Additionally, or alternatively, the response may be sent to the IoT origin server 130.

Figure 4:
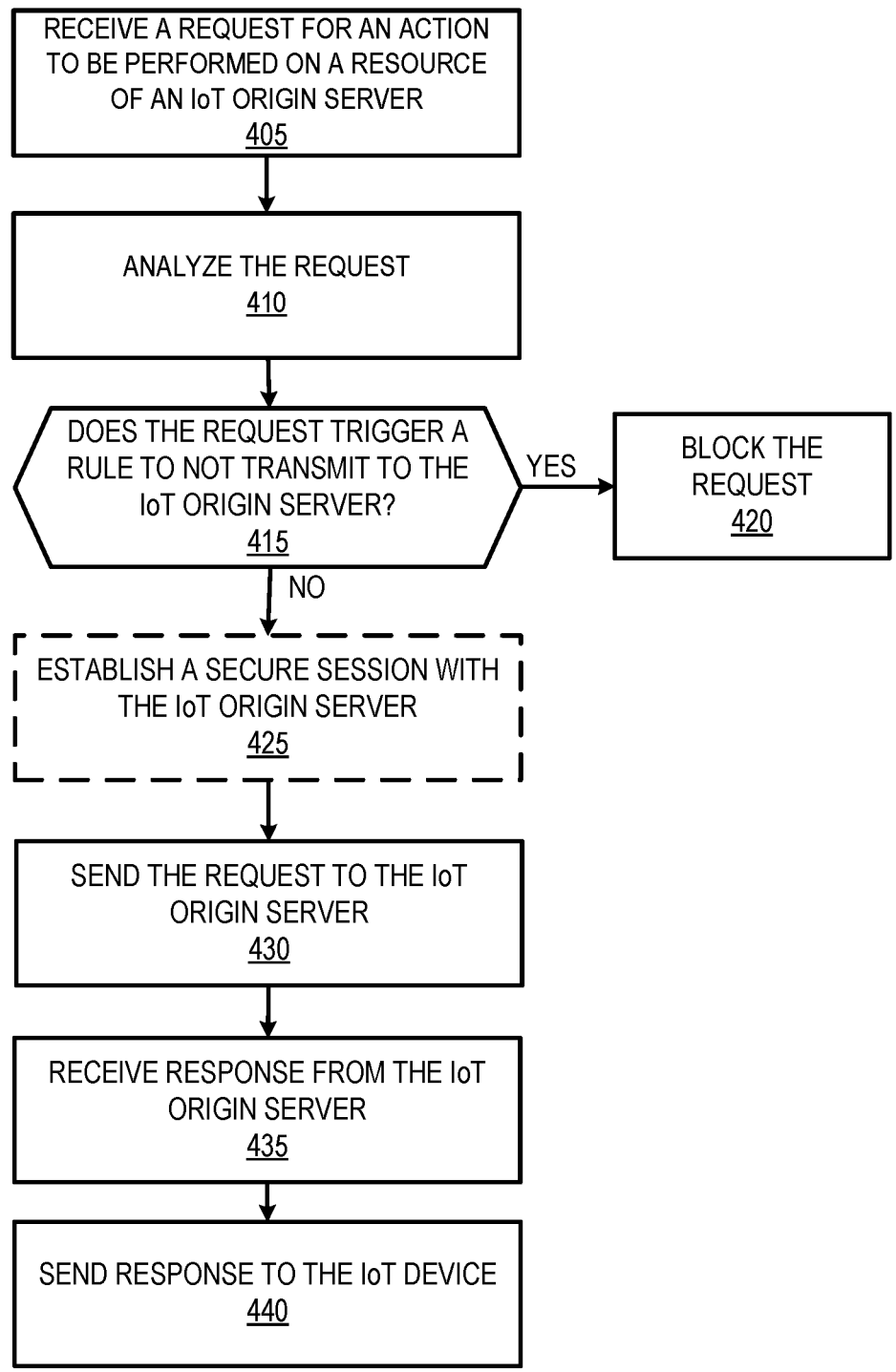
FIG. 4 shows example operations that are performed for an IoT protection service according to an embodiment.

FIG. 4 shows an example of operations that are performed for an IoT protection service according to an embodiment. The operations shown in FIG. 4 will be described as performed by an edge server of the IoT protection service (e.g., the edge server 120). The operations of FIG. 4 will be described with respect to the exemplary embodiment of FIG. 1. However, the operations of FIG. 4 can be performed by different embodiments than those of FIG. 1, and FIG. 1 can perform operations different than those of FIG. 4.

At operation 405, a request for an action to be performed on an identified resource of the IoT origin server 130 is received by the edge server 120, from the IoT device 110. The request may be an HTTP request (e.g., a GET request, a POST request). The request may be received at the edge server 120 because a DNS request for a domain handled by the IoT origin server 130 returns an IP address of the edge server 120 instead of an IP address of the IoT origin server 130. To say it another way, DNS lookups for the IoT device 110 resolve to an IP address of the edge server 120 instead of the IoT device 110.

The request may be received over a secure session (e.g., a TLS connection) between the requesting IoT device 110 and the edge server 120. The secure session may be protected with mutual TLS authentication. In this case, mutual TLS authentication allows the IoT protection service to determine that an IoT device belongs to the IoT vender's network, and not for example a malicious attacker trying to infiltrate their IoT infrastructure. The customer of the IoT protection service (e.g., the IoT manufacturer) may upload one or more root certificates for which the device certificates are validated against. The certificate(s) may be uploaded to the IoT control server 140 and distributed to the edge server 120. During the secure session establishment, the IoT device 110 transmits its certificate to the edge server 120. The edge server 120 performs an authentication to determine whether the client certificate is one of the certificates allowed. For example, the edge server 120 may validate that the client certificate presented by the IoT device 110 is signed by the IoT manufacturer's root CA certificate. By validating this certificate on each request, access can be limited to authorized client connections from authorized IoT devices. If the certificate is validated, then the secure session can be established (shown as communication link 180) and the request can be processed by the edge server 120. If the certificate is not validated, then the secure session may be refused and the edge server 120 may transmit a message to the IoT device 110 that indicates that the certificate is missing, expired, or invalid (e.g., a 403 error). Thus, the request may be blocked if the secure session fails to be established and/or if a valid certificate is not presented.

Next, at operation 410, the edge server 120 analyzes the request to determine whether to transmit the request to the IoT origin server 130. For instance, the IoT protection module 160 may apply one or more web application firewall (WAF) rules against the request to determine whether the request should be transmitted to the IoT origin server 130. Examples of WAF rules that may be applied are previously described herein. Additionally, or alternatively, the IoT protection module 160 may perform rate limiting check to identify and mitigate high request rates. For instance, the rate limiting check may determine if the sender of the request (e.g., as identified by source IP address) exceeds a threshold and if so, rate limit the sender.

Next, at operation 415, the edge server 120 determines whether the request triggers a rule to not transmit the request to the IoT origin server 130. For instance, if the request triggers a WAF rule, the edge server 120 will block the request. As another example, if the request triggers rate limiting, the edge server 120 will block the request and future requests from the IoT device 110 for a period. If the request triggers a rule to not transmit to the IoT origin server 130, then at operation 420 the edge server 120 blocks the request. The edge server 120 may log the blocking of the request. If, however, the request does not trigger a rule to not transmit to the IoT origin server 130, then operations flow to operation 425.

At operation 425, which is optional in an embodiment, the edge server 120 participates in a secure session establishment (e.g., a TLS session) with the IoT origin server 130. The secure session may be protected with mutual TLS authentication where the edge server 120 presents a certificate signed by the CA. The origin server 130 may then validate whether the certificate is valid. This allows the origin server 130 to limit access to connections with valid certificates of the IoT protection service. Additionally, or alternatively, the IoT origin server may only allow requests from a predefined set of IP address(es), such as the IP address(es) of the edge server 120.

At operation 430 the edge server 120 sends the request to the IoT origin server 130. The IoT origin server 130 processes the request. The IoT origin server 130 may transmit data in a response to the request. Thus, at operation 435, the edge server 120 receives a response from the IoT origin server 130. The response typically includes data generated and/or stored by the IoT origin server 130. The edge server 120 transmits the response to the IoT device 110 at operation 440.

Figure 5:
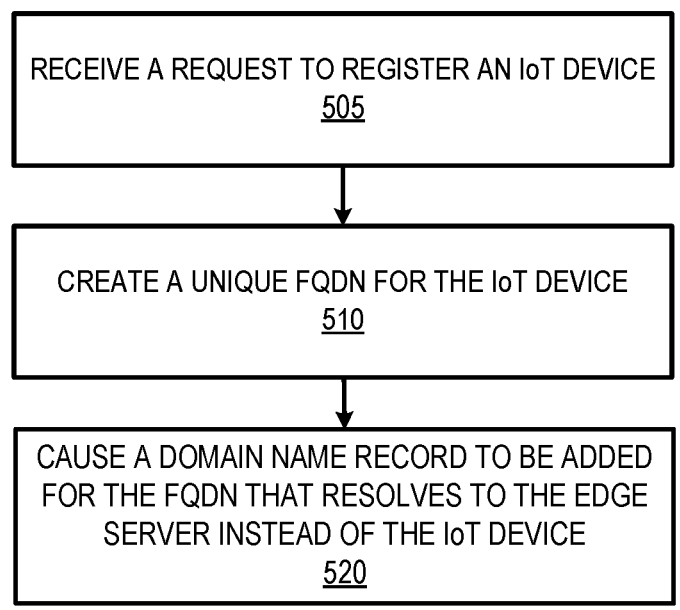
FIG. 5 shows example operations for adding and configuring an IoT device adding to the IoT protection service, according to an embodiment.

FIG. 5 shows example operations for adding and configuring an IoT device adding to the IoT protection service, according to an embodiment. The operations of FIG. 5 are described as being performed by the IoT origin server 130. The operations of FIG. 5 will be described with respect to the exemplary embodiment of FIG. 1. However, the operations of FIG. 5 can be performed by different embodiments than those of FIG. 1, and FIG. 1 can perform operations different than those of FIG. 5.

At operation 505, the IoT origin server 130 receives a request to register an IoT device 110. The request may be received from the IoT device 110 upon the device booting. The request may be received via an API provided by the IoT origin server 130. If the domain of the API resolves to the edge server 120 instead of the IoT origin server 130 (e.g., if the DNS has been configured such that the API domain resolves to the edge server 120 instead of the IoT origin server 130), the edge server 120 may proxy the request between the IoT device 110 and the IoT origin server 130. Alternatively, the IoT origin server 130 may receive the request directly (bypassing the edge server 120). The request includes information to allow the IoT origin server to register the IoT device 110 in its IoT device registry. For example, the information sent may include a device identifier, the IP address of the IoT device (which may be the public IP address of the IoT device), the port in which the IoT device 110 is listening, and may include a shared cryptographic secret.

Next, at operation 510, the IoT origin server 130 creates a unique FQDN for the IoT device 110. For instance, if the IoT origin server 130 handles the domain "example.com", the unique fully qualified domain name may take the form of "[Device_ID].example.com" where the device_id is a unique identifier of the IoT device (e.g., a universally unique identifier (UUID)). The unique identifier may be assigned to the IoT device by the IoT manufacturer (e.g., during manufacturing). The unique identifier may be formed using the IP address of the IoT device and the port in which it is listening.

Next, at operation 520, the IoT origin server 130 causes a DNS record to be added or updated for the IoT device at its FQDN. The IoT protection service may provide tools for the IoT manufacturer to add or update DNS records. For instance, the IoT origin server 130 may use an API provided by the IoT protection service through the IoT control server 140. The IoT origin server 130 may provide the FQDN to the IoT control server 140 with a request to add or update a DNS record. The IoT control server 140 updates the DNS system 150 such that a DNS record for the IoT device 110 points to the edge server 120 instead of to the IoT device 110 directly. For example, a DNS request for an IP address of "device1.example.com" would return an IP address of the edge server 120 instead of the IP address of the IoT device 110.

After the DNS record for the IoT device 110 has been added or updated, IoT clients may communicate with the IoT device 110 (if allowed by the configuration). Instead of using the IP address of the IoT device 110 to reach it directly, IoT clients are configured to perform a DNS resolution for the IoT device 110 to learn the IP address of the IoT device 110 (which is maintained by the IoT protection service). Thus, traffic destined for the IoT device is received through the IoT protection service.

Figure 6:
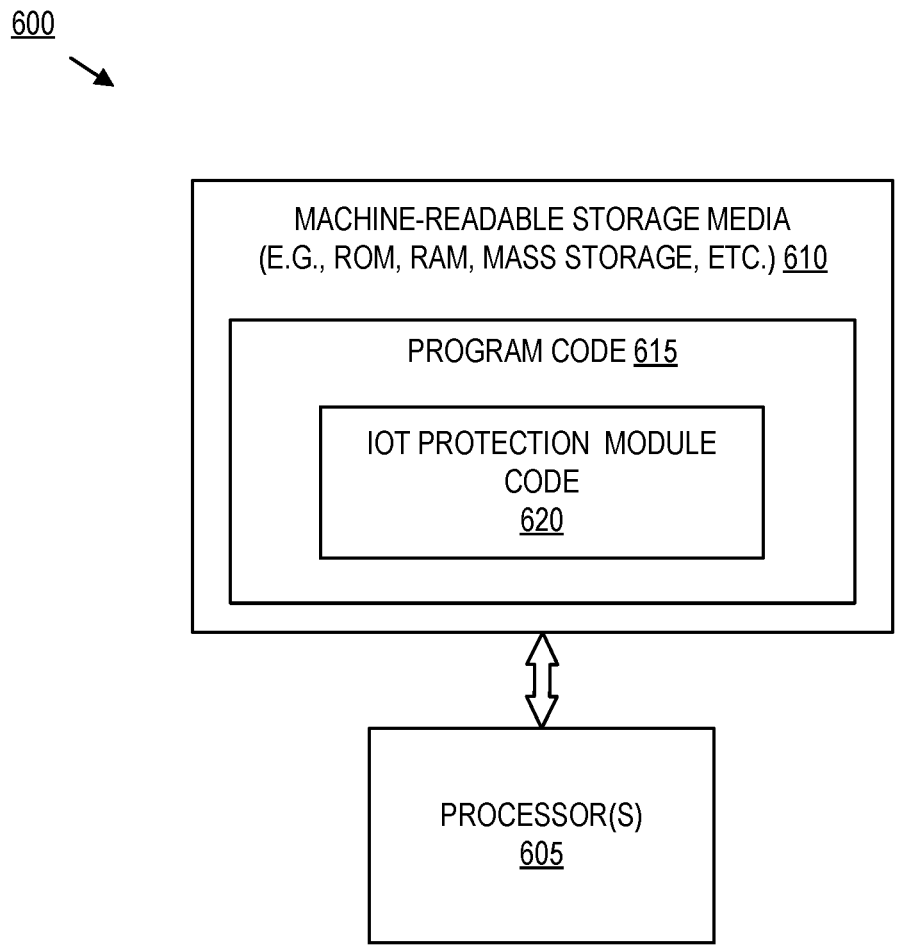
FIG. 6 illustrates an exemplary format of a data processing system that may be used according to some embodiments.

FIG. 6 shows a block diagram for an exemplary data processing system 600 that may be used in some embodiments. Data processing system 600 includes one or more processors 605 and connected system components (e.g., multiple connected chips). Alternatively, the data processing system 600 is a system on a chip or Field-Programmable gate array. One or more such data processing systems 600 may be utilized to implement the embodiments and operations described with reference to FIGS. 1-5.

The data processing system 600 is an electronic device which stores and transmits (internally and/or with other electronic devices over a network) code (which is composed of software instructions and which is sometimes referred to as computer program code or a computer program) and/or data using machine-readable media (also called computer-readable media), such as non-transitory machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 605.

For example, the depicted non-transitory machine-readable storage media 610 may store program code 615 that, when executed by the processor(s) 605, causes the data processing system 600 to perform the IoT protection functionality described herein. For example, the program code 615 may include the IoT protection module code 620 that, when executed by the processor(s) 605, cause the data processing system 600 to perform the operations of FIGS. 3-4.

The data processing system 600 also includes a set or one or more physical network interface(s) to establish network connections (to transmit and/or receive code and/or data using propagating signals) with other electronic devices. It will be appreciated that one or more buses may be used to interconnect the various components shown in FIG. 6. One or more parts of an embodiment of the invention may be implemented using different combinations of software, firmware, and/or hardware. In an embodiment, the resolver devices may take the form of the data processing system 600.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in an edge server of an Internet of Things (IoT) protection service, comprising:
    establishing a secure session with an IoT client;
    receiving, at the edge server from the IoT client over the secure session, a first request for an action to be performed on an identified resource of an IoT device, wherein the first request is received at the edge server because of a Domain Name System (DNS) request for a unique fully qualified domain name assigned to the IoT device returning an IP address of the edge server instead of an IP address of the IoT device;
    analyzing the first request to determine whether to transmit the first request to the IoT device, wherein analyzing the first request includes applying a first set of one or more web application firewall (WAF) rules against the first request to determine whether to transmit the first request to the IoT device;
    determining to transmit the first request to the IoT device;
    transmitting the first request to the IoT device;
    receiving, from the IoT device, a response that includes data; and
    transmitting the response including the data to the IoT client.

2. The method of claim 1, wherein establishing a secure session with the IoT client includes validating a client certificate of the IoT client that is issued by an IoT manufacturer of the IoT device.

3. The method of claim 1, further comprising:
    installing a second WAF rule to protect against an exploit that the IoT device is vulnerable against.

4. The method of claim 3, further comprising:
    receiving, at the edge server, a second request for an action to be performed on an identified resource of the IoT device;
    analyzing the second request to determine whether to transmit the second request to the IoT device, wherein analyzing the second request includes applying the second WAF rule to the second request; and
    responsive to determining that the second request triggers the second WAF rule, blocking the second request from being transmitted to the IoT device.

5. The method of claim 1, further comprising:
    establishing a secure session with the IoT device including validating a client certificate of the IoT device;
    receiving, at the edge server from the IoT device over the secure session, a second request for an action to be performed on an identified resource of an IoT origin server, wherein the second request is received at the edge server because a DNS request for a domain handled by the IoT origin server returns an IP address of the edge server instead of an IP address of the IoT origin server;
    analyzing the second request to determine whether to transmit the second request to the IoT origin server, wherein analyzing the first request includes applying a second set of one or more web application firewall (WAF) rules against the second request to determine whether to transmit the second request to the IoT origin server;
    determining to transmit the second request to the IoT origin server;
    transmitting the second request to the IoT origin server;
    receiving, from the IoT origin server, a response that includes data; and
    transmitting the response including the data to the IoT device.

6. The method of claim 5, wherein transmitting the second request is over a secure session established between the edge server and the IoT origin server, wherein establishing the secure session between the edge server and the IoT origin server includes transmitting a certificate of the edge server to the IoT origin server for validation.

7. The method of claim 1, further comprising:
    receiving a software or firmware update that is applicable to the IoT device;
    caching the received software or firmware update at the edge server;
    receiving a request from the IoT device for the software or firmware update; and
    responsive to the received request, transmitting the software or firmware update to the IoT device.

8. A non-transitory machine-readable storage medium that provides instructions that, when executed by a processor of an edge server of an Internet of Things (IoT) protection service, cause said edge server to perform operations comprising:
- establishing a secure session with an IoT client;
- receiving, at the edge server from the IoT client over the secure session, a first request for an action to be performed on an identified resource of an IoT device, wherein the first request is received at the edge server because of a Domain Name System (DNS) request for a unique fully qualified domain name assigned to the IoT device returning an IP address of the edge server instead of an IP address of the IoT device;
- analyzing the first request to determine whether to transmit the first request to the IoT device, wherein analyzing the first request includes applying a first set of one or more web application firewall (WAF) rules against the first request to determine whether to transmit the first request to the IoT device;
- determining to transmit the first request to the IoT device;
- transmitting the first request to the IoT device;
- receiving, from the IoT device, a response that includes data; and
- transmitting the response including the data to the IoT client.

9. The non-transitory machine-readable storage medium of claim 8, wherein establishing a secure session with the IoT client includes validating a client certificate of the IoT client that is issued by an IoT manufacturer of the IoT device.

10. The non-transitory machine-readable storage medium of claim 8, wherein the operations further comprise:
- installing a second WAF rule to protect against an exploit that the IoT device is vulnerable against.

11. The non-transitory machine-readable storage medium of claim 10, wherein the operations further comprise:
- receiving, at the edge server, a second request for an action to be performed on an identified resource of the IoT device;
- analyzing the second request to determine whether to transmit the second request to the IoT device, wherein analyzing the second request includes applying the second WAF rule to the second request; and
- responsive to determining that the second request triggers the second WAF rule, blocking the second request from being transmitted to the IoT device.

12. The non-transitory machine-readable storage medium of claim 8, wherein the operations further comprise:
- establishing a secure session with the IoT device including validating a client certificate of the IoT device;
- receiving, at the edge server from the IoT device over the secure session, a second request for an action to be performed on an identified resource of an IoT origin server, wherein the second request is received at the edge server because a DNS request for a domain handled by the IoT origin server returns an IP address of the edge server instead of an IP address of the IoT origin server;
- analyzing the second request to determine whether to transmit the second request to the IoT origin server, wherein analyzing the first request includes applying a second set of one or more web application firewall (WAF) rules against the second request to determine whether to transmit the second request to the IoT origin server;
- determining to transmit the second request to the IoT origin server;
- transmitting the second request to the IoT origin server;
- receiving, from the IoT origin server, a response that includes data; and
- transmitting the response including the data to the IoT device.

13. The non-transitory machine-readable storage medium of claim 12, wherein transmitting the second request is over a secure session established between the edge server and the IoT origin server, wherein establishing the secure session between the edge server and the IoT origin server includes transmitting a certificate of the edge server to the IoT origin server for validation.

14. The non-transitory machine-readable storage medium of claim 8, wherein the operations further comprise:
- receiving a software or firmware update that is applicable to the IoT device;
- caching the received software or firmware update at the edge server;
- receiving a request from the IoT device for the software or firmware update; and
- responsive to the received request, transmitting the software or firmware update to the IoT device.

15. An edge server of an Internet of Things (IoT) protection service, comprising:
- a processor; and
- a non-transitory machine-readable storage medium that provides instructions that, when executed by the processor, cause the edge server to carry out operations including:
  - establish a secure session with an IoT client;
  - receive, at the edge server from the IoT client over the secure session, a first request for an action to be performed on an identified resource of an IoT device, wherein the first request is to be received at the edge server because of a Domain Name System (DNS) request for a unique fully qualified domain name assigned to the IoT device returning an IP address of the edge server instead of an IP address of the IoT device;
  - analyze the first request to determine whether to transmit the first request to the IoT device including applying a first set of one or more web application firewall (WAF) rules against the first request to determine whether to transmit the first request to the IoT device;
  - determine to transmit the first request to the IoT device;
  - transmit the first request to the IoT device;
  - receive, from the IoT device, a response that includes data; and
  - transmit the response including the data to the IoT client.

16. The edge server of claim 15, wherein the operation of establish the secure session with the IoT client includes a validation of a client certificate of the IoT client that is issued by an IoT manufacturer of the IoT device.

17. The edge server of claim 15, wherein the operations further include:
- install a second WAF rule to protect against an exploit that the IoT device is vulnerable against.

18. The edge server of claim 17, wherein the operations further include:
- receive, at the edge server, a second request for an action to be performed on an identified resource of the IoT device;

analyze the second request to determine whether to transmit the second request to the IoT device including applying the second WAF rule to the second request; and responsive to a determination that the second request triggers the second WAF rule, block the second request from being transmitted to the IoT device.

19. The edge server of claim 15, wherein the operations further include:

establish a secure session with the IoT device including validating a client certificate of the IoT device;

receive, at the edge server from the IoT device over the secure session, a second request for an action to be performed on an identified resource of an IoT origin server, wherein the second request is to be received at the edge server because a DNS request for a domain handled by the IoT origin server returns an IP address of the edge server instead of an IP address of the IoT origin server;

analyze the second request to determine whether to transmit the second request to the IoT origin server including applying a second set of one or more web application firewall (WAF) rules against the second request to determine whether to transmit the second request to the IoT origin server;

determine to transmit the second request to the IoT origin server;

transmit the second request to the IoT origin server;

receive, from the IoT origin server, a response that includes data; and transmit the response including the data to the IoT device.

20. The edge server of claim 19, wherein the second request is to be transmitted over a secure session established between the edge server and the IoT origin server, and wherein the operation of establish the secure session between the edge server and the IoT origin server includes a transmission of a certificate of the edge server to the IoT origin server for validation.

21. The edge server of claim 15, wherein the operations further include:

receive a software or firmware update that is applicable to the IoT device;

cache the received software or firmware update at the edge server;

receive a request from the IoT device for the software or firmware update; and responsive to receipt of the request, transmit the software or firmware update to the IoT device.

* * * * *